(12) United States Patent
Kim

(10) Patent No.: US 8,914,346 B1
(45) Date of Patent: Dec. 16, 2014

(54) CLUSTERED SEARCH INDEXING FOR CORRELATED DATA GROUPS

(75) Inventor: Yong Sung Kim, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 56 days.

(21) Appl. No.: 13/366,167

(22) Filed: Feb. 3, 2012

(51) Int. Cl.
*G06F 17/30* (2006.01)

(52) U.S. Cl.
USPC .............................. 707/705; 725/53; 725/145

(58) Field of Classification Search
USPC .................................................... 725/53, 145
See application file for complete search history.

(56) References Cited

U.S. PATENT DOCUMENTS 7,603,685 B2 * 10/2009 Knudson et al. ................. 725/46
8,225,354 B2 * 7/2012 Acton et al. ..................... 725/49
2006/0092052 A1 * 5/2006 Baldwin et al. ................. 341/50

* cited by examiner

*Primary Examiner* — Olugbenga Idowu
(74) *Attorney, Agent, or Firm* — Morgan, Lewis & Bockius LLP

(57) ABSTRACT

Systems, methods and devices described herein enable producing and utilizing a clustered search index as a way of searching correlated data groups, such as channel lineups. In particular, in some implementations systems, methods and devices are operable to create a clustered search index that includes clusters of TV channels frequently provided together in various channel lineups in order to improve searching efficiency. That is, the resultant search index is based on sub-lineups of channels that are shared by multiple channel lineups (i.e. sub-lineup indexing). Each sub-lineup includes channels that are frequently provided together, as determined by analysis of the channel lineups offered by the various providers. Additionally and/or alternatively, in some implementations systems, methods and devices are operable to process a search query by selecting a number of pertinent channel clusters from a clustered search index associated with one or more characteristics associated with the query.

21 Claims, 8 Drawing Sheets

CLUSTERED SEARCH INDEXING FOR CORRELATED DATA GROUPS

TECHNICAL FIELD

The present disclosure generally relates to searching correlated data groups, and in particular, to producing and utilizing a clustered search index to enable searching correlated data groups.

BACKGROUND

Creating a relatively efficient indexing scheme can be especially difficult for television (TV) program search services because of overlap between the vast number of channel lineups (i.e. combinations of channels) offered by various providers. For example, currently in the United States, there are approximately 16,000 different TV channels that are included in approximately 55,000 channel lineups that have been created based on factors such as geographic location, regional preferences and available modes of delivery (e.g. cable, satellite, over-the-air). For example, a first lineup offered in New York by a cable provider may include 900 channels, and a second lineup offered in San Francisco by a satellite provider may include 750 channels. And despite being offered by different providers for different geographic locations, the first and second lineups may have 200 common channels.

A particular user may have access to tens, hundreds or even thousands of TV channels depending on the lineup selected by the user. When searching for a TV program, the user will typically only want search results for TV programs on channels the user actually has access to. Previously known methods of creating a search index applicable for TV program listings have flaws that are exacerbated by the enormous number of correlated lineups that need to be searched in order to service a query from a particular user. For example, indexing by channels or by TV programs results in computationally expensive search processes that are relatively inefficient, and consequently, are often slow even when executed by data centers or the like.

SUMMARY

In some implementations systems, methods and devices are operable to create a clustered search index that includes clusters of TV channels frequently provided together in various channel lineups in order to improve searching efficiency. Additionally and/or alternatively, in some implementations systems, methods and devices are operable to process a search query by selecting a number of pertinent channel clusters from a clustered search index associated with one or more characteristics associated with the query. In some implementations, channels are clustered into groups of similar channels, including but not limited to national groups of channels commonly included in lineups across an entire country, regional groups of channels commonly used in lineups across an entire region, and to local tiers of channels used in local lineups. By clustering channels into groups, storage for common channels is reduced (e.g., national channels do not need to replicated across hundreds of lineups) and the number of channel lineups that need to be searched in response to a user TV search query is also reduced.

One aspect of the disclosure is a method producing a search index for correlated data groups. In some implementations, the method includes identifying one or more sets of data elements shared by two or more data groups; generating a respective cluster of data elements for each of the one or more identified sets of data elements; indexing each cluster so that each cluster can be selected and retrieved independently for searching; and storing each indexed cluster in a non-volatile memory space allotted for the search index.

Another aspect of the disclosure is a method of searching a clustered index. In some implementations, the method includes parsing a received search query to identify at least one query characteristic; selecting one or more clusters based on at least one query characteristic; searching the selected clusters; and merging the search results.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, illustrate only some example features of the present disclosure and are therefore not to be considered limiting, for the description may admit to other effective features.

Figure 1:
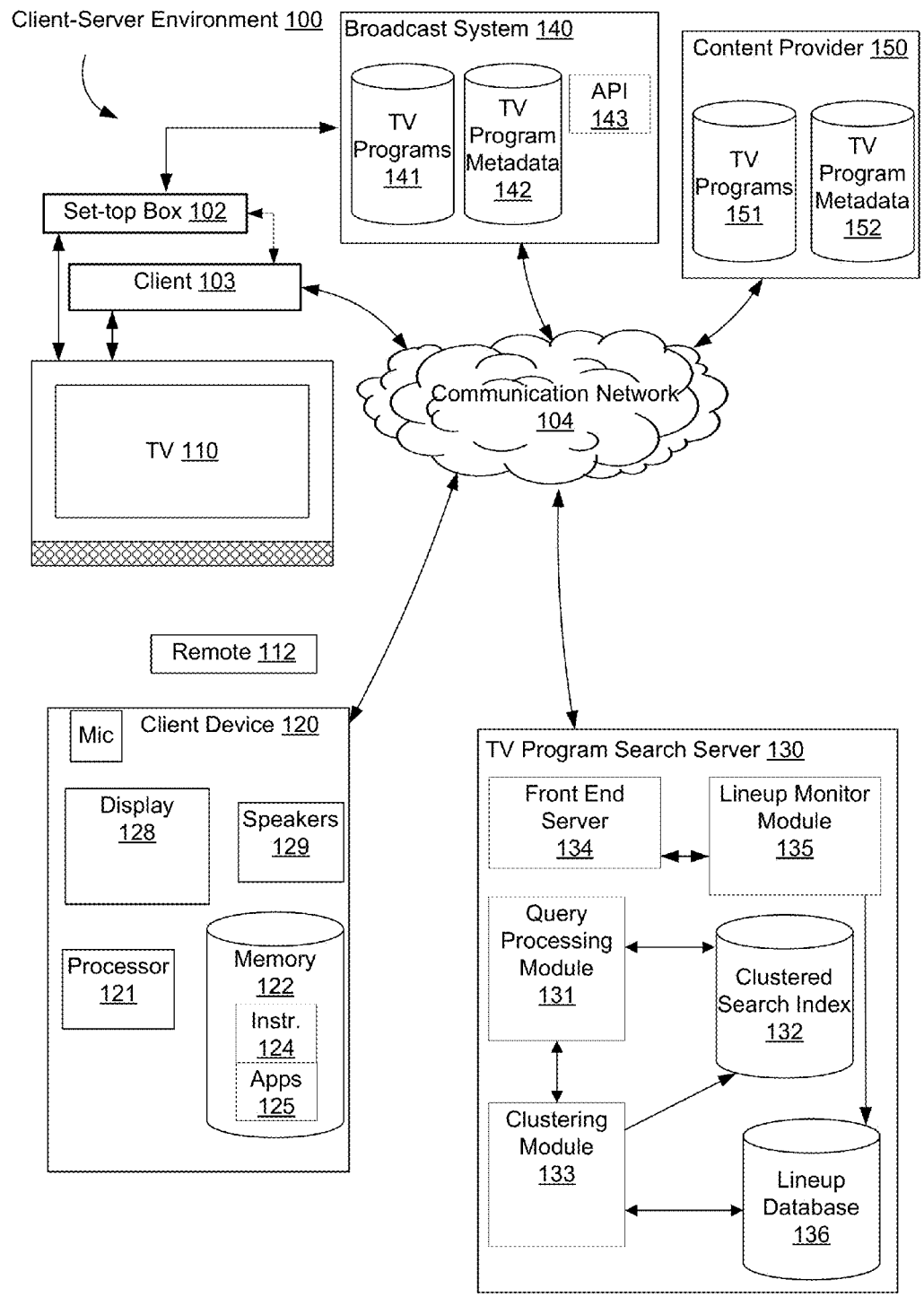
FIG. 1 is a block diagram of an example client-server environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Systems, methods and devices described herein enable producing and utilizing a clustered search index for searching correlated data groups, such as channel lineups. In particular, in some implementations systems, methods and devices are operable to create a clustered search index that includes clusters of TV channels frequently provided together in various channel lineups in order to improve TV program searching efficiency. That is, the resultant search index is based on sub-lineups of channels that are shared by multiple channel lineups. Each sub-lineup includes channels that are frequently provided together, as determined by analysis of the channel lineups offered by the various providers. Additionally and/or alternatively, in some implementations systems, methods and devices are operable to process a search query by selecting a number of pertinent channel clusters from a clustered search index associated with one or more characteristics associated with the query. For example, upon receiving a search query from a client device, a search server system parses the query to identify one or more pertinent query characteristics, selects and searches one or more clusters from the clustered search index based on at least one pertinent query characteristic, and returns search results to the client device.

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1 is a block diagram of an example client-server environment 100 according to some implementations. While certain specific features are illustrated, those skilled in the art will appreciate from the present disclosure that various other features have not been illustrated for the sake of brevity and so as not to obscure more pertinent aspects of the example implementations disclosed herein. Thus, as a non-limiting example, the client-server environment 100 includes a set-top box 102, a client device 103, a television (TV) 110, a second screen client device 120, a remote control 112, a communication network 104, a TV program search server 130, a broadcast system 140, and a content provider 150. While FIG. 1 only includes one of each of the aforementioned devices and systems those skilled in the art will appreciate from the present disclosure that any number of such devices and/or systems may be provided in a client-server environment.

The client device 103, the second screen client device 120, the TV program search server 130, the broadcast system 140, and the content provider 150 are capable of being connected to the communication network 104 in order to exchange information with one another and/or other devices and systems.

The communication network 104 may be any combination of wired and wireless local area network (LAN) and/or wide area network (WAN), such as an intranet, an extranet, including a portion of the internet. It is sufficient that the communication network 104 provides communication capability between the second screen client device 120 and the TV program search server 130. In some implementations, the communication network 104 uses the HyperText Transport Protocol (HTTP) to transport information using the Transmission Control Protocol/Internet Protocol (TCP/IP). HTTP permits the client device 120, for example, to access various resources available via the communication network 104. However, the various implementations described herein are not limited to the use of any particular protocol.

The TV program search server 130 can be implemented as a single server system, while in other implementations it is implemented as a distributed system of multiple servers. Solely for convenience of explanation, the TV program search server 130 is described below as being implemented on a single server system. Similarly, the broadcast system 140 can be implemented as a single server system or a distributed system of multiple servers. Solely, for convenience of explanation, the broadcast system 140 is described below as being implemented on a single server system. Similarly, the content provider 150 can be implemented as a single server system or a distributed system of multiple servers. Solely, for convenience of explanation, the content provider 150 is described below as being implemented on a single server system. Moreover, the functionality of the broadcast system 140 and the content provider 150 can be combined into a single server system.

In some implementations, the set-top box 102, the client device 103, the TV 110, and the remote control 112 are provided in combination. The set-top box 102 is configured to receive and decode signals including media content from the broadcast system 140 or the like. In some implementations, the set-top box 102 is also internet-enabled in order to receive signals including media content or the like. In operation, the set-top box 102 decodes the signal received from the broadcast system 140 or the like and provides audio and video content to the TV 110 for display. While a TV has been used in the illustrated example, those skilled in the art will appreciate from the present disclosure that any number of display devices, including computers, laptop computers, tablet computers, smart-phones and the like, can be used to display a video stream and play the associated audio stream. Additionally and/or alternatively, the functions of the set-top box 102 and the TV 110 may be combined into a single device.

In some implementations, the set-top box 102 is any suitable computer device capable of connecting to the communication network 104, receiving video streams, extracting information from video streams and presenting video streams for the display using the TV 110 (or another display device). In some implementations, the set-top box 102 includes components to receive and present video streams. For example, the client device 102 may be configured as a receiver for cable TV and/or satellite TV, a digital video recorder (DVR), a digital media receiver, a TV tuner, a computer, and/or any other device that outputs TV signals. In some implementations, the set-top box 102 displays a video stream on the TV 110. In some implementations the TV 110 can be a conventional TV display that is not connectable to the internet and that displays digital and/or analog TV content received via over the air broadcasts or a satellite or cable connection.

As is typical of televisions, the TV 110 includes a display 118 and speakers 119. Additionally and/or alternatively, the TV 110 can be replaced with another type of display device 108 for presenting video content to a user. For example, the display device may be a computer monitor that is configured to receive and display audio and video signals or other digital content from the set-top box 102. In some implementations, the display device is an electronic device with a central processing unit, memory and a display that is configured to receive and display audio and video signals or other digital content form the set-top box 102. For example, the display device can be a LCD screen, a tablet device, a mobile telephone, a projector, or other type of video display system. The display device can be coupled to the set-top box 102 via a wireless or wired connection.

As used herein, a TV signal is an electrical, optical, or other type of data transmitting medium that includes audio and/or video components corresponding to a TV channel. In some implementations, the TV signal is a terrestrial over-the-air TV broadcast signal or a sign distributed/broadcast on a cable-system or a satellite system. In some implementations, the TV signal is transmitted as data over a network connection. For example, the set-top box 102 can receive video streams from an Internet connection. Audio and video components of a TV signal are sometimes referred to herein as audio signals and video signals. In some implementations, a TV signal corresponds to a TV channel that is being displayed on the TV 110.

In operation, the remote control 112 may be used to control the operation of one or more of the set-top box 102, the TV 110, and the client device 103. In operation, the client device 103 receives information from the set-top box 102 associated with the media content presented on the TV 110. In turn, the client device 103 may then communicate with any one of the TV program search server 130, the broadcast system 140, and the content provider 150 through the communication network 104.

The second screen client device 120 may be any suitable computer device that is capable of connecting to the communication network 104, such as a computer, a laptop computer, a tablet device, a netbook, an internet kiosk, a personal digital assistant, a mobile phone, a gaming device, or any other device that is capable of communicating with the TV program search server 130. In some implementations, the second screen client device 120 includes one or more processors 121, non-volatile memory 122 such as a hard disk drive, a display 128, speakers 129, and a microphone 123. The second screen client device 120 may also have input devices such as a keyboard, a mouse and/or track-pad (not shown). In some implementations, the second screen client device 120 includes a touch screen display, a digital camera and/or any number of supplemental devices to add functionality.

In some implementations, the display device 128 can be any display for presenting video or other visual content to a user. In some implementations, the display device 128 is the display of a television, or a computer monitor, that is configured to receive and display audio and video signals or other digital content from the second screen client device 120. In some implementations, the display device 128 is an electronic device with a central processing unit 121, a memory 122 and a display that is configured to receive and display audio and video signals or other digital content. In some implementations, the display device 128 is a LCD screen, a tablet device, a mobile telephone, a projector, or any other type of video display system. In some implementations, the second screen client device 120 is connected to and/or integrated with the display device 128. In some implementations, the display device 128 includes, or is otherwise connected to, speakers capable of producing an audible stream corresponding to the audio component of a TV signal or video stream.

In some implementations, the second screen client device 120 may be connected to the set-top box 102 via a wireless or wired connection. In some implementations where such connection exists, the second screen client device 120 may optionally operate in accordance with instructions, information and/or digital content (collectively "second screen information") provided by the set-top box 102. In some implementations, the set-top box 102 issues instructions to the second screen client device 120 that cause the second screen client device 120 to present on the display 128 and/or the speaker 129 digital content that is complementary, or related to, digital content that is being presented by the client 102 on the TV 110.

In some implementations, the second screen client device 120 includes a microphone 123 that enables the client device to receive sound (audio content) from, for example, the speakers 119 of the TV 110. The microphone 123 enables the second screen client device 120 to store the audio content/soundtrack that is associated with the video content as it is presented. The second screen client device 120 can store this information locally and then send to the TV program search server 130 content information that is any one or more of: fingerprints of the stored audio content, the audio content itself, portions/snippets of the audio content, fingerprints of the portions of the audio content or references to the playing content. In some implementations, the second screen client device 120 includes one or more applications 125 stored in the memory 122, which are executable by the processor 121.

In some implementations, the TV program search server 130 includes a front end server 134 that facilitates communication between the TV program search server 130 and the communication network 104. For example, the front end server 134 receives search queries from the second screen client device 120 or the client device 103. As described in greater detail below, in some implementations, a search query includes a query for a particular TV program and/or characteristic information pertaining to the query, such as location information, an IP address or subscription information that can be used to service the search query. In reply, the front end server 134 is configured to transmit search results to the requesting device. In some implementations, the search results may include content files, links to content files and/or metadata associated with the content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams.

In some implementations, the TV program search server 130 includes a lineup monitor module 135 that is configured to collect information about lineups provided through the broadcast system 140 and/or by the content provider 150. For example, in some implementations, lineup information may be retrieved from a service such as, but not limited to, a Tribune Media Services database or the like. In some implementations, the TV program search server 130 includes a lineup database 136 that stores lineup configurations and associated content. Again a lineup includes a collection of channels created based on factors such as geographic location, regional preferences and available modes of delivery (e.g. cable, satellite, over-the-air), and is typically offered by a cable or satellite TV service provider. For example, a first lineup offered in New York by a cable provider may include 900 channels, and a second lineup offered in San Francisco by a satellite provider may include 750 channels. And despite being offered by different providers, the first and second lineups may have 200 channels in common. In some implementations, the lineup database 136 is a distributed database.

In some implementations, the TV program search server 130 includes a clustering module 133, which is configured to utilize the information stored in the lineup database 136 to produce the clustered search index 132. In some implementations, as described below with reference to FIG. 5, clustering of channels is performed according to the respective channel call signs because the mapping between channel numbers and the channel call signs are often different between different lineups. In some implementations, the clustered search index 132 includes an indexed arrangement channel sub-lineups (i.e. clusters). The sub-lineups are created by the clustering module 136, as discussed in greater detail below, based on grouping together channels that are frequently found together in various channel lineups offered by various providers. In other words, the sub-lineups are identifiable and distinguishable groupings of channels that are often found together in different lineups. However, it should be understood that the term "sub" does not imply a relatively smaller grouping of channels as compared to lineups offered by a cable or satellite provider. For example, as will be described in greater detail below, a particular sub-lineup may include either a lesser or a greater number of channels than a particular lineup.

In some implementations, the TV program search server 130 includes a query processing module 131, which is configured to utilize the clustered search index 132 to service search queries received by the front end server 134. For example, in some implementations, the query processing module 131 parses the received query to identify one or more pertinent query characteristics, selects and searches one or more clusters (i.e. sub-lineups) from the clustered search index, and returns search results. That is, a combination of sub-lineups is selected to service a search query associated with one or more actual lineups.

In some implementations, the broadcast system 140 includes media content such as TV programs 141. In other words, the broadcast system 140 includes electronic copies of the media content. In some implementations, the broadcast system 140 also includes metadata 142 associated with one or more of the TV programs 141, and application program interface instructions 143. In some implementations, the application program interface instructions 143 include instructions that can be provided to a client device and/or may be executed by the broadcast system 140 under a client-server model or the like in order to link a particular TV program 141 with the associated metadata 142 and/or link the TV program 141 and the associated metadata 142 with external data and/or services, such as a social networking application. Similarly, in some implementations, the content provider 150 additionally and/or alternatively includes media content such as TV programs 151, as well as metadata 152 associated with one or more of the TV programs 151.

Figure 2:
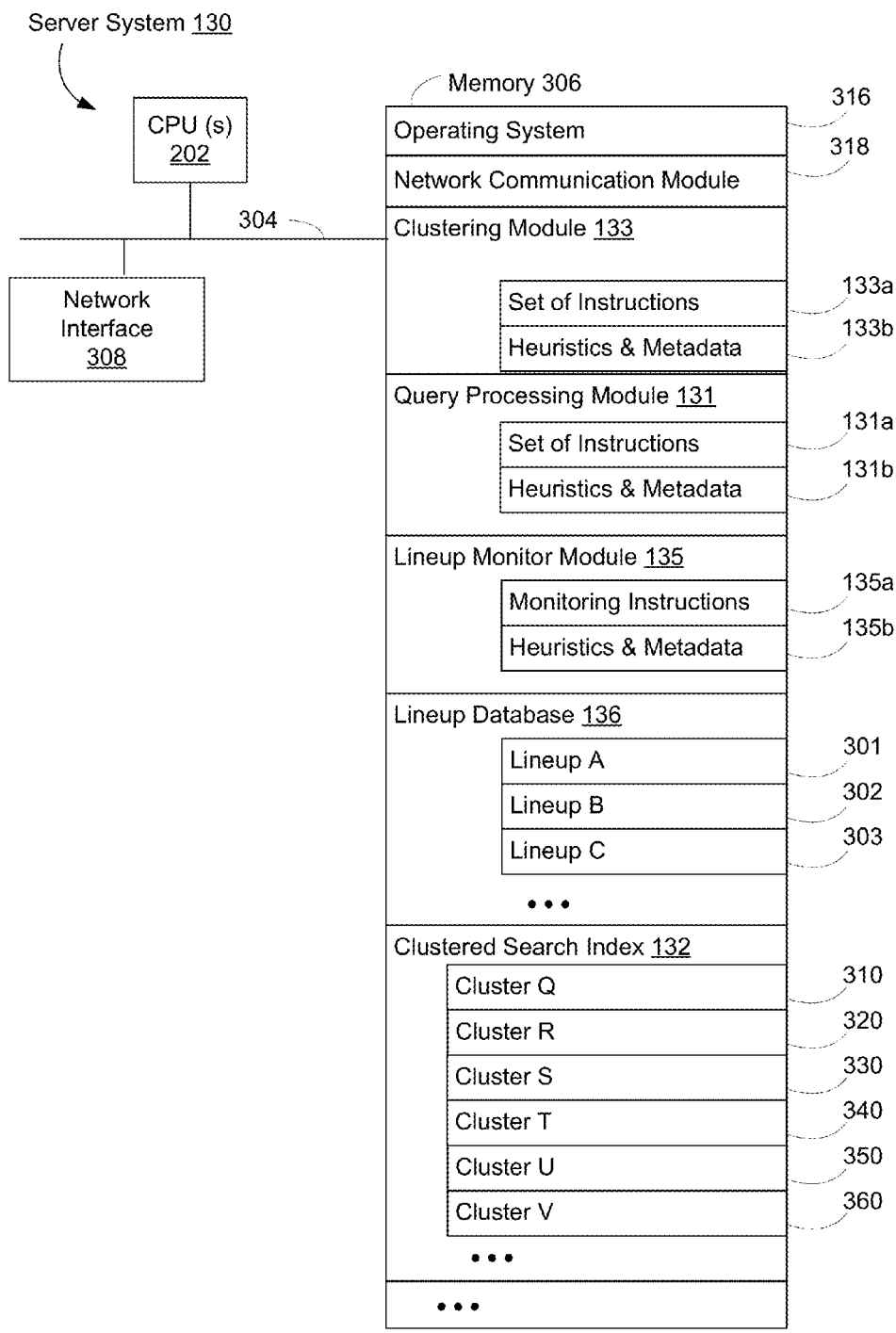
FIG. 2 is a block diagram of an example implementation of a server system.

FIG. 2 is a block diagram of an example implementation of a TV program search server system 130 as discussed above with reference to FIG. 1. The TV program search server system 130 illustrated in FIG. 2 is similar to and adapted from the TV program search server system 130 illustrated in FIG. 1. Elements common to both implementations include common reference numbers, and only the differences between FIGS. 1 and 2 are described herein for the sake of brevity. Moreover, while certain specific features are illustrated, those skilled in the art will appreciate from the present disclosure that various other features have not been illustrated for the sake of brevity, and so as not to obscure more pertinent aspects of the implementations disclosed herein.

To that end, in some implementations, the TV program search server system 130 includes one or more processing units (CPU's) 202, one or more network or other communications interfaces 308, memory 306, and one or more communication buses 304 for interconnecting these and various other components. The communication buses 304 may include circuitry (sometimes called a chipset) that interconnects and controls communications between system components. The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 202. The memory 306, including the non-volatile and volatile memory device(s) within the memory 306, comprises a non-transitory computer readable storage medium. In some implementations, the memory 306 or the non-transitory computer readable storage medium of the memory 306 stores the following programs, modules and data structures, or a subset thereof including an operating system 316, a network communication module 318, a clustering module 133, a query processing module 131, a lineup monitor module 135, lineup database 136, and a clustered search index 132.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on. With further reference to FIG. 1, the network communication module 318 may be incorporated into the front end server 134.

As noted above, the lineup database 136 stores channel lineup configurations and/or associated content. For example, the lineup database 136 stores lineups 301, 302 and 303, which are discussed in more detail with reference to FIG. 3. Similarly, as also noted above, the clustered search index 132 includes an indexed arrangement channel sub-lineups (i.e. clusters). For example, the clustered search index 132 includes clusters 310, 320, 330, 340, 350, 360, which are discussed in more detail with reference to FIG. 3.

In some implementations, the query processing module 131 is configured to utilize the clustered search index 132 to service received search queries. To that end, in some implementations the query processing module 131 includes a set of instructions 131a and heuristics and metadata 131b.

In some implementations, the lineup monitor module 135 is configured to collect information about lineups and store the information in the lineup database 136. To that end, in some implementations the lineup monitor module 135 includes a set of instructions 135a and heuristics and metadata 135b.

In some implementations, the clustering module 133 is configured to utilize the information stored in the lineup database 136 to produce the clustered search index 132. To that end, in some implementations the clustering module 133 includes a set of instructions 133a and heuristics and metadata 133b.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., clustering module 133) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Moreover, FIG. 2 is intended more as functional description of the various features which may be present in a set of servers as opposed to a structural schematic of the implementations described herein. In practice, and as recognized by those of ordinary skill in the art, items shown separately could be combined and some items could be separated. For example, some items (e.g., operating system 316 and network communication module 318) shown separately in FIG. 2 could be implemented on single servers and single items could be implemented by one or more servers. The actual number of servers used to implement the TV program search server 130 and how features are allocated among them will vary from one implementation to another, and may depend in part on the amount of data traffic that the system must handle during peak usage periods as well as during average usage periods.

Figure 3:
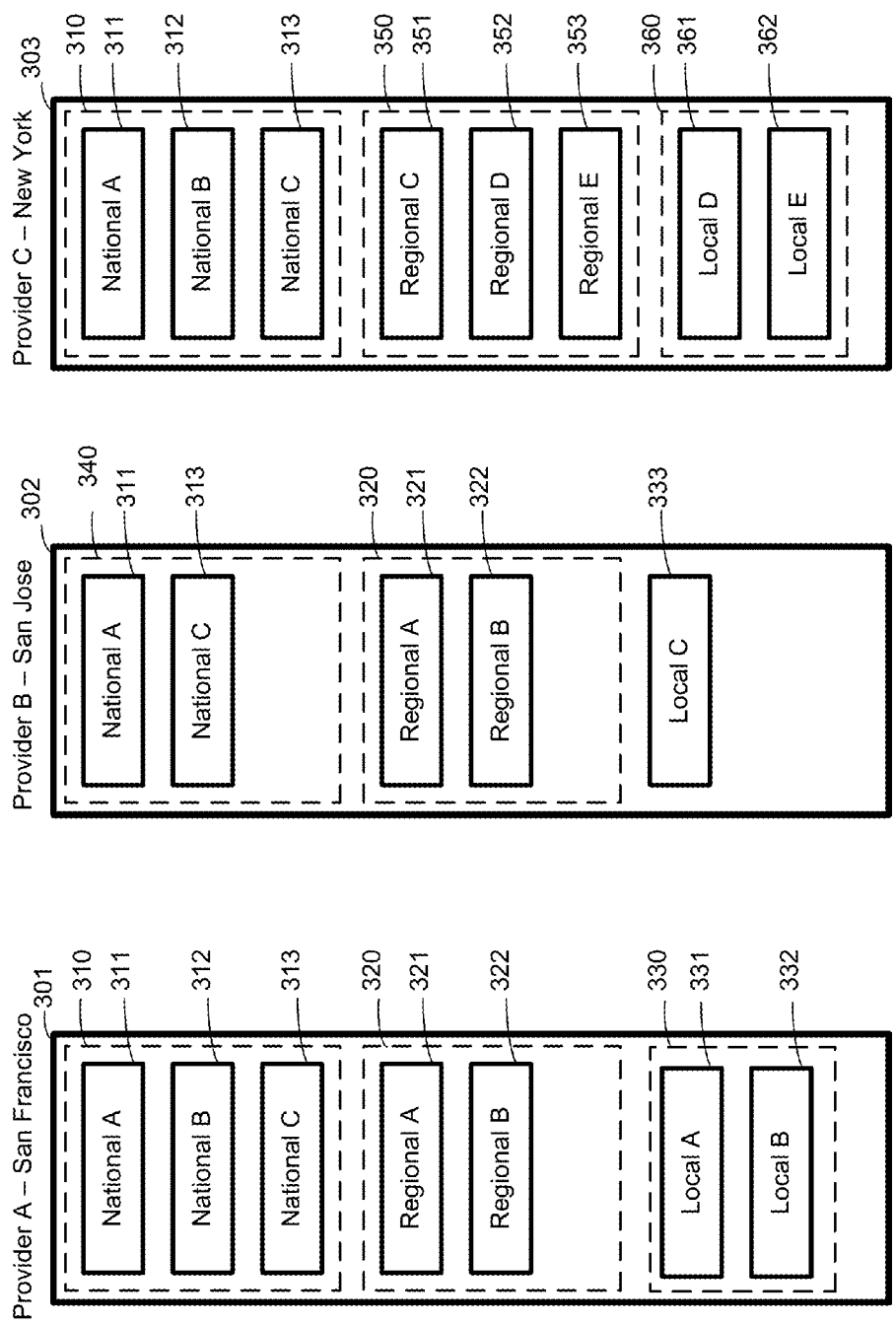
FIG. 3 is a block diagram of example channel lineups and clusters.

FIG. 3 is a block diagram of three (first, second, and third) simplified example channel lineups 301, 302, 303 and clusters 310, 320, 330, 340, 350, 360 that may be derived from the channel lineups 301, 302, 303. Those skilled in the art will appreciate from the present disclosure that the example lineups 301, 302, 303 are simplified lineups provided for demonstrative purposes only, and that actual channel lineups typically include more detailed compositions of channels than shown in FIG. 3.

The first lineup 301, for example, is provided by a first provider, Provider A, for the San Francisco, Calif. market. The first lineup 301 includes three national channels 311, 312, 313 (also shown as National A, National B and National C, respectively), two regional channels 321, 323 (also shown as Regional A and Regional B, respectively), and two local channels 331, 332 (also shown as Local A and Local B, respectively). Similarly, the second lineup 302, for example, is provided by a first provider, Provider B, for the San Jose, Calif. market. As compared to the first lineup 301, the second lineup 302 includes two of the national channels 311, 313, the same two regional channels 321, 323, and a different local channel 333 (also shown as Local C). Similarly, the third lineup 303, for example, is provided by a third provider, Provider C, for the New York, N.Y. market. As compared to the first lineup 301, the third lineup 303 includes the same three national channels 311, 312, 313, three different regional channels 351, 352, 353 (also shown as Regional C, Regional D, and Regional E, respectively), and two different local channels 361, 362 (also shown as Local D and Local E, respectively).

How a TV program search query from a user subscribing to any of the lineups 301, 302, 303 is processed depends on how the search index is configured (i.e. indexed).

Lineups tend to be correlated data groups. Correlated data groups include elements that are duplicated in two or more of the data groups. There are a number of challenges associated with searching correlated data groups. In particular, it can be difficult to create a search index that allows the correlated data groups to be searched relatively efficiently.

If the search index is indexed by lineup, the resultant system would require storing each lineup and the corresponding channel and program data associated with each lineup, and providing a mechanism for first selecting a particular lineup for searching. The problem with such an approach is that it is memory intensive, because the corresponding channel and program data for each channel would be duplicated in the memory as many times as each channel appears in a different lineup. Consequently, the resultant lineup database would be very large, and thus it would be difficult to transmit and store multiple copies of the search index in distributed datacenters that handle the search requests. In particular, a distributed search system configured to store multiple copies of a large lineup database, including duplicate copies of corresponding channel and program data, would be prone to synchronization errors between the separately stored copies.

In contrast to merely indexing by channel lineups, according to implementations described herein, channel and program data are indexed based on channel clusters derived from lineups offered by various providers. Thus, the resultant search index is based on sub-lineups of channels that are shared by multiple channel lineups (i.e. each sub-lineup includes channels that are frequently provided together). For example, with further reference to FIG. 3, the three national lineups 311, 312, 313 are included in the same sub-lineup 310 because these three channels are typically included in multiple lineups with one another. Similarly, sub-lineup 320 includes the regional channels 321, 322 provided to subscribers of either lineup 301 or 302. Similarly, sub-lineup 350 includes the regional channels 351, 352 provided to subscribers of lineup 303. Similarly, sub-lineups 330 and 360 include local channels 331, 332 and 361, 362, respectively.

In one implementation, as described below with reference to FIG. 6, sub-lineups may be derived from the relative frequency with which channels are included in the various lineups. Additionally and/or alternatively sub-lineups may be derived from lineups by threshold values that characterize how correlated/uncorrelated the various sub-lineups may be for a particular implementation. For example, with further reference to FIG. 3, although the second lineup 302 only includes two of the three national channels in the example, it may be more efficient to use sub-lineup 310 for a search query from a subscriber of lineup 302 than define another sub-lineup 340 that is specific to lineup 302. In general, there may be less duplication of channel and program data in the index if the sub-lineups are generally less correlated with one another.

As noted above, it should be understood that the term "sub" does not imply a relatively smaller grouping of channels as compared to lineups offered by a cable or satellite provider. A particular sub-lineup may include either a lesser or a greater number of channels than a particular lineup. With further reference to FIG. 3, for example, depending on the specifications of a particular implementation, it may be preferable to combine the first and second lineups 301, 302 because of the large amount of overlap between the two. An example of the resulting lineup (not shown) may include without duplication all three national channels 311, 312, 313, both regional channels 321, 322, and all three local channels 331, 332, 333. The example resulting lineup would thus have more channels than either of the first and second lineups 301, 302.

Figure 4:
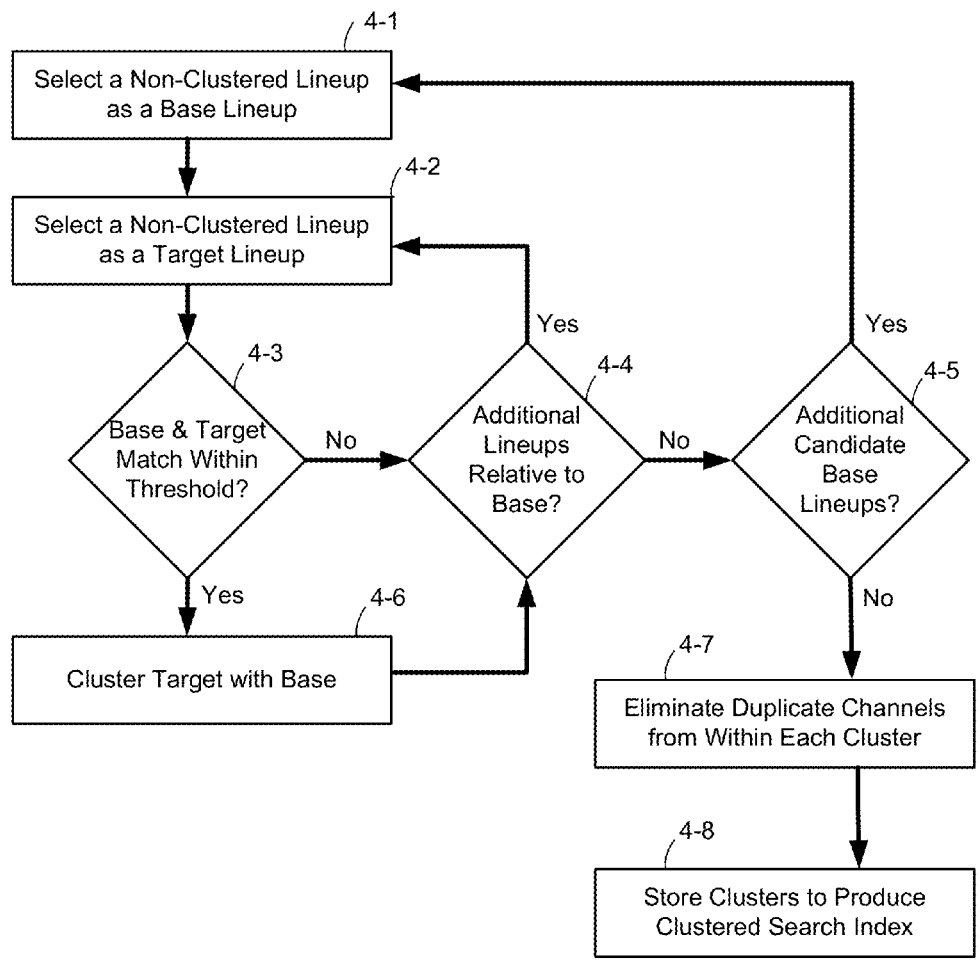
FIG. 4 is a flowchart representation of an implementation of a server system method.
Figure 8:
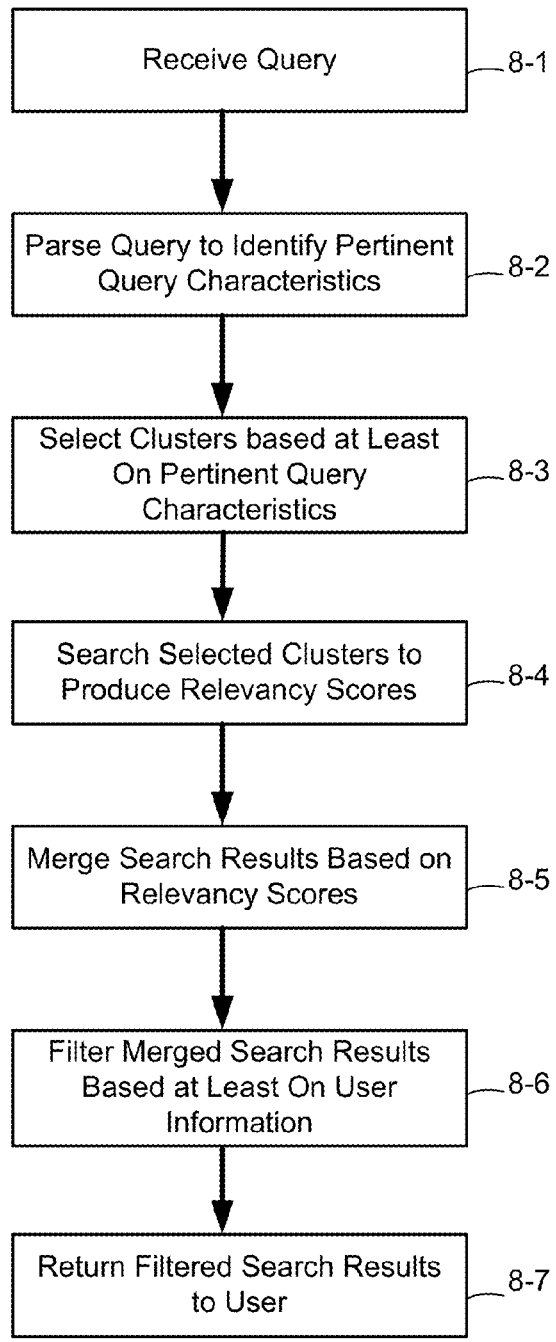
FIG. 8 is a flowchart representation of an implementation of a server system method.

FIG. 4 is a flowchart representation of an example implementation of a server system method of generating a clustered search index. In some implementations, the method is performed by a server system in order to produce a clustered search index, which is indexed by clusters derived from lineups offered by various providers. The method generates a clustered search index by combining lineups that are similar with respect to one another within a particular threshold, so that duplicate channels in the combination of lineups can be eliminated. Moreover, as noted above, in some implementations, clustering of channels is performed according to the respective channel call signs because the mapping between channel numbers and the channel call signs is often different between different lineups. In turn, search results, as discussed below with reference to FIG. 8, are filtered using both the channel call signs and channel number mapping in order to provide a user in a particular area, that subscribes to a particular lineup, accurate channel numbers in response to search queries.

To that end, the method includes selecting a non-clustered lineup as a base lineup (4-1). The method includes selecting a non-clustered target lineup to compare to the previously selected base lineup (4-2). The method includes determining whether the base and target lineups match within a threshold (4-3). For example, as discussed above with reference to FIG. 3, the first and second lineups 301, 302 each have a significant amount of overlap with one another. In some implementations the threshold includes a percentage and/or a number of overlapping channels between the base and the target lineups. For example, the threshold may be defined as 90% overlap between the base and the target lineups.

If the base and the target lineups match within the threshold ("Yes" path from 4-3), the method includes clustering the target with the base lineup (4-6). In some implementations, at this point, clustering includes grouping the lineups together without yet merging the two lineups, so as to allow for later modification of the clustering. In some implementations, at this point, clustering includes both merging the base and the target lineups and eliminating duplicates (i.e. merging without duplication), so that the resultant cluster includes no more than one of each constituent channel from the combination of the base and target lineups. On the other hand, if the base and the target lineups do not match within the threshold ("No" path from 4-3), the method includes determining whether or not there are additional target lineups to consider relative to the selected base lineup (4-4).

If there are additional target lineups to consider relative to the selected base lineup ("Yes" path from 4-4), the method loops back to the portion of the method represented by 4-2. On the other hand, if there are no additional target lineups to consider relative to the selected base lineup ("No" path from 4-4), the method includes determining whether or not there are additional candidate base lineups to consider (4-5). For example, in some implementations, candidate base lineups are lineups that have yet to be clustered with another lineup.

If there are additional candidate base lineups to consider ("Yes" path from 4-5), the method loops back to the portion of the method represented by block 4-1. On the other hand, if there are no additional candidate base lineups to consider ("No" path from 4-5), the method includes merging each of the respective base lineups with the corresponding matched target lineups and eliminating duplicates from clusters, so that the resultant cluster includes no more than one of each constituent channel from the combination of a respective base lineup and the corresponding matched target lineups (4-7). For example, with reference to FIG. 3, an example of a resulting lineup (not shown), derived from the first and second lineups 301, 302, may include without duplication all three national channels 311, 312, 313, both regional channels 321, 322, and all three local channels 331, 332, 333. The example resulting lineup would thus have more channels than either of the first and second lineups 301, 302. The method includes storing and addressing the pruned clusters to produce a clustered search index (4-8).

Figure 5:
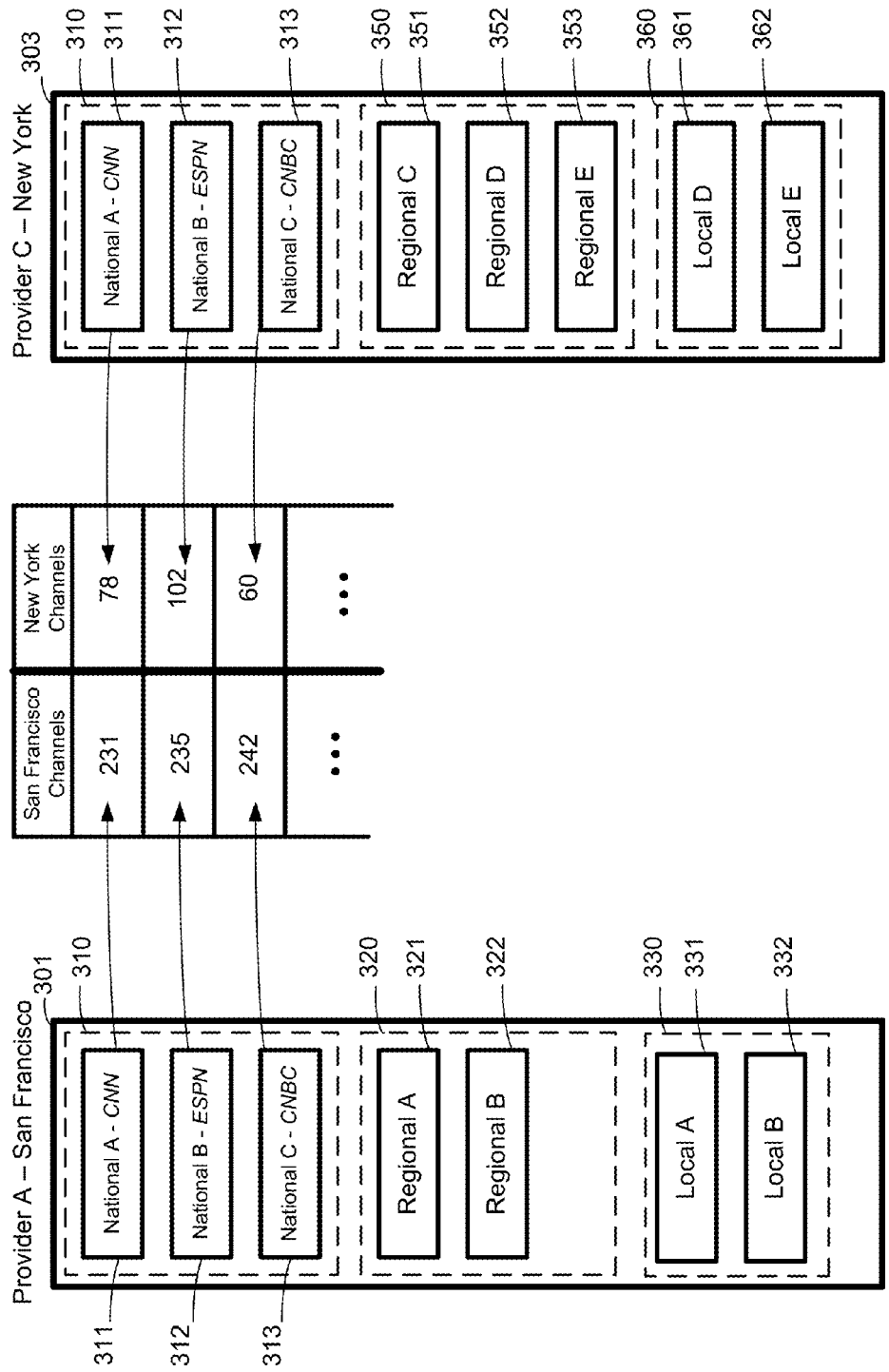
FIG. 5 is a block diagram of example channel lineups, clusters and channel number mapping.

FIG. 5 is a block diagram of example channel lineups, clusters and channel number mapping. FIG. 5 is similar to and adapted from FIG. 3. As such, elements common to FIGS. 3 and 5 include common reference numbers, and only the differences between FIGS. 3 and 5 are described herein for the sake of brevity. Often the mapping between channel numbers and the channel call signs is often different between different lineups. For example, with reference to FIG. 5, the three national channels 311, 312, 313 have respective call signs CNN, ESPN, CNBC. In the first lineup 301, the three national channels 311, 312, 313 are mapped to corresponding channel numbers 231, 235, 242 (irrespective of the call signs), and to corresponding channel numbers 78, 102, 60 in the third lineup 303. As such, in some implementations it is preferable to cluster based on the call signs, and retrieve the channel numbers from the mapping for a particular lineup after the search process using the clusters has been performed.

Figure 6:
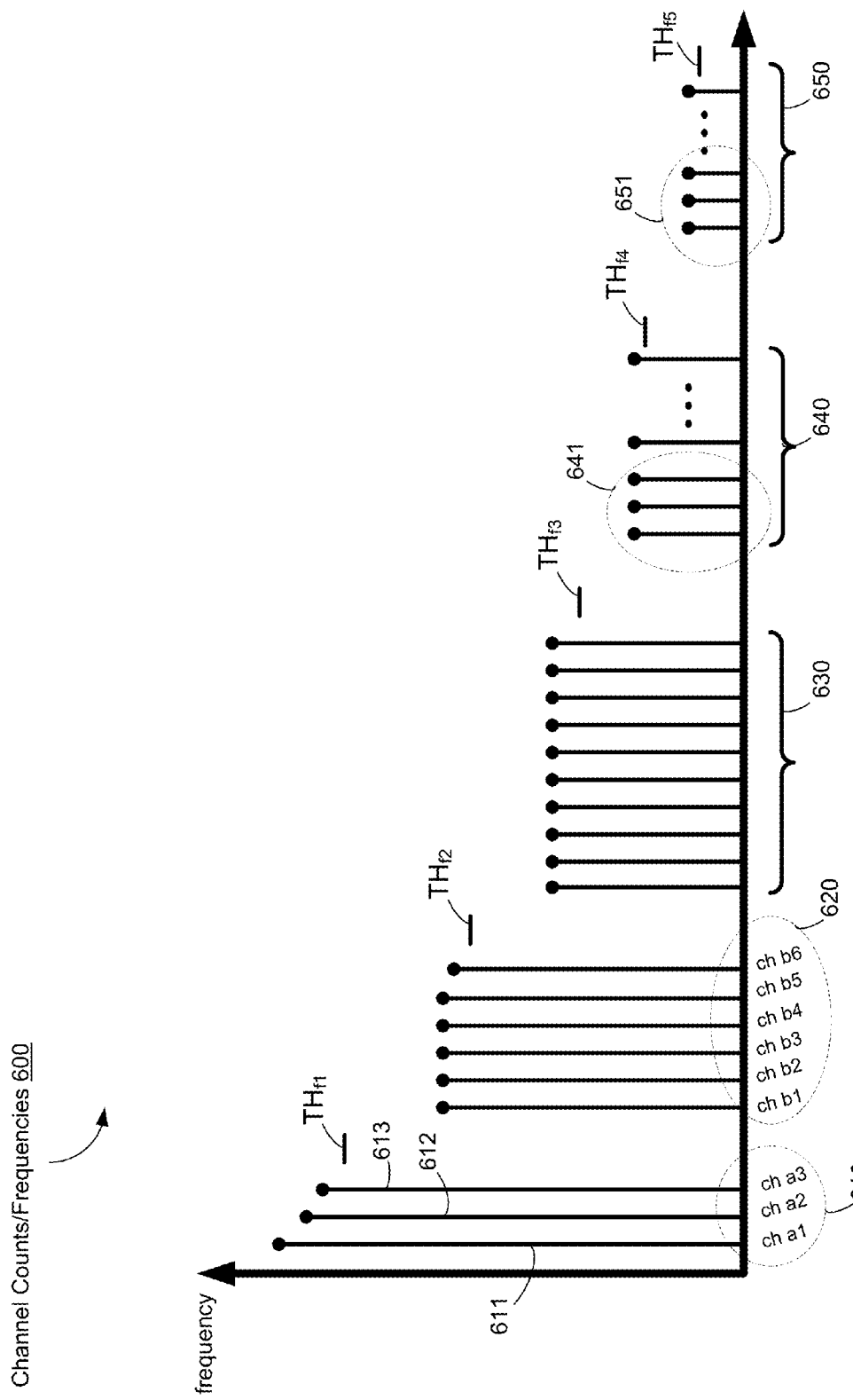
FIG. 6 is a chart of clustering based on relative channel frequencies.

FIG. 6 is a chart 600 of example clusters based on relative channel frequencies. That is, the chart 600 schematically illustrates the ordering of channels according to the number of times (i.e. the frequency) each channel appears in a lineup. For example, the lineups considered may be the approximately 55,000 lineups available in the United States.

The chart 600 includes five groups of channels 610, 620, 630, 640, 650 that are arranged in order of descending channel frequency and are defined by threshold frequency levels $TH_{f1}$, $TH_{f2}$, $TH_{f3}$, $TH_{f4}$, $TH_{f5}$. The first group 610, for example, includes first, second and third channels 611, 612, 613 (also shown as channels a1-a3, respectively), which each have a frequency greater than the first threshold $TH_{f1}$. Similarly, the second group includes six channels (i.e. channels b1-b6), which each have a respective frequency between the first and second thresholds $TH_{f1}$, $TH_{f2}$. The other groups 630, 640, 650 are similarly defined with respect to the thresholds $TH_{f3}$, $TH_{f4}$, $TH_{f5}$. As discussed below with reference to FIG. 7, there are a number of ways by which the thresholds that define the groups may be empirically identified.

Figure 7:
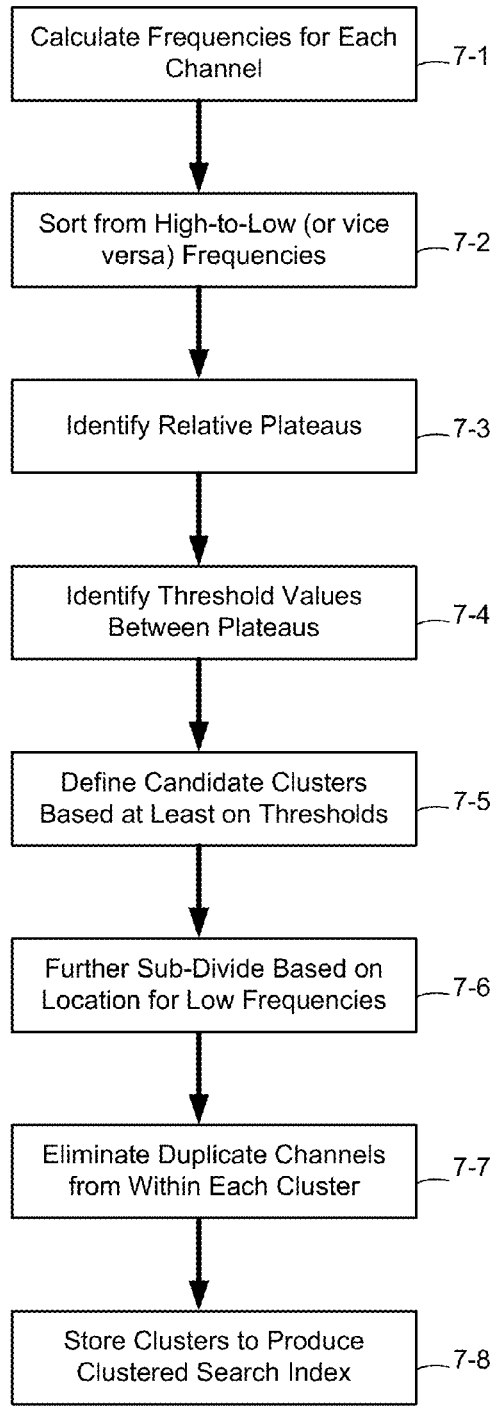
FIG. 7 is a flowchart representation of an implementation of a server system method.

FIG. 7 is a flowchart representation of an example implementation of a server system method, which is described with continued reference to FIG. 6. In some implementations, the method is performed by a server system in order to produce a clustered search index, which is indexed by sub-lineups of channels (i.e. clusters) included together in lineups offered by various providers. The method generates a clustered search index including sub-lineups of channels that are frequently provided together, as determined by analysis of the channel lineups offered by various providers.

To that end, the method includes calculating the relative frequencies for each channel in the collection of lineups available (7-1). As represented by block 7-2, the method includes sorting the channel frequencies from high-to-low (or vice versa) to reveal patterns based on the channel frequencies (7-2). The method includes identifying relative frequency plateaus in the sorted channel frequencies (7-3). For example, with reference to FIG. 6, the groups 610, 620, 630, 640, 650 may each be identified by a corresponding relative plateau or a corresponding average frequency value. The method includes identifying threshold values between the relative plateaus in order to define the groups (7-4). In some implementations, each threshold value is an indicator of substantial separation between two groups of channels. For example, with reference to FIG. 6, the first threshold value, $TH_{f1}$, defines separation between the first group of channels 610 and the second group of channels 620.

The method includes defining candidate clusters based at least on the threshold values previously identified (7-5). With further reference to FIG. 6, the groups 610, 620, 630, 640, 650 may be considered candidate clusters, which are defined by at least the threshold values $TH_{f1}$, $TH_{f2}$, $TH_{f3}$, $TH_{f4}$, $TH_{f5}$. In some implementations, the groups (e.g. 610, 620) defined by relatively high threshold values (e.g. $TH_{f1}$, $TH_{f2}$) likely include the relatively popular national and/or trans-regional channels that are included in a relatively large number of channel lineups (e.g. channels a1-a3 and channels b1-b6). But the groups (e.g. 640, 650) defined by relatively low threshold values (e.g. $TH_{f4}$, $TH_{f5}$) likely include the plethora of regional and local channels that are each only included in a relatively small number of channel lineups. As a result, in some implementations, it is beneficial to employ additional factors to cluster channels defined by the relatively low frequency thresholds.

To that end, in some implementations the method includes further sub-dividing the groups (e.g. 640, 650) defined by relatively low threshold values (e.g. $TH_{f4}$, $TH_{f5}$) based on factors such as location, popularity, language and/or type of content (7-6). For example, with reference to FIG. 6, clusters 641 and 651 are separated from groups 640 and 650, respectively.

The method includes eliminating duplicates from clusters, so that the resultant cluster includes no more than one of each constituent channel from the combination of a respective base lineup and the corresponding matched target lineups (7-7). The method includes storing and addressing the pruned clusters to produce a clustered search index (7-8).

FIG. 8 is a flowchart representation of an example implementation of a server system method. In some implementations, the method is performed by a server system in order to service a search query by utilizing a clustered search index. To that end, the method includes receiving a query for a program listing from a subscriber (8-1). For example, a user may submit a search query for a particular program on a national news network. In another example, the user may submit a search query for a particular program on a local station. With reference to FIG. 1, the user may submit the query through either the second screen device 120 or the client device 103. The method includes parsing the query to identify pertinent query characteristics (8-2). For example, in some implementations a query includes a location indicator, an IP address, an indication of the lineup subscribed to by the user submitting the query.

The method includes selecting clusters based at least on one of the pertinent query characteristics (8-3). For example, if the user search query is for a program on a national news channel, the cluster including national news channel would be selected. In another example, if the user search query is for a program that may be on a number of regional channels and a national channel, then the clusters including the pertinent region channels and the national channel would be selected. The method includes searching the selected clusters (8-4). The method includes merging the results based on, for example, relevancy scores (8-5). The method includes filtering the merged search results based at least on user information (8-6). The method includes returning the filtered search results for the program listing requested by the user (8-7). Moreover, as noted above, in some implementations, clustering of channels is performed according to the respective channel call signs because the mapping between channel numbers and the channel call signs are often different in different lineups. In turn, search results are filtered using both the channel call signs and channel number mapping in order to provide a user in a particular area, that subscribes to a particular lineup, accurate channel numbers in response to search queries. In particular, in some implementations, the respective one or more channel numbers from the mapping for a particular lineup are retrieved after the search process using the clusters has been performed.

The foregoing description, for purpose of explanation, has been described with reference to specific implementations. The aspects described above may be implemented in a wide variety of forms, and thus, any specific structure and/or function described herein is merely illustrative. Moreover, the illustrative discussions above are not intended to be exhaustive or to limit the methods and systems to the precise forms disclosed. Many modifications and variations are possible in view of the above teachings. The implementations were chosen and described in order to best explain the principles of the methods and systems and their practical applications, to thereby enable others skilled in the art to best utilize the various implementations with various modifications as are suited to the particular use contemplated.

Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A computer-implemented method of producing a search index for correlated data groups, the method comprising:
    in a server with a processor and memory storing programs for execution by the processor:
    identifying one or more sets of data elements shared by two or more correlated data groups, wherein the one or more sets of data elements are identified according to a respective frequency for each data element, and each respective frequency represents how many data groups the respective data element is included in;
    generating a plurality of clusters, wherein a respective cluster of the plurality of clusters includes one of the one or more identified sets of data elements;
    indexing each cluster of the plurality of clusters so that each respective cluster can be selected and searched independently from other ones of the plurality of clusters; and
    storing each indexed cluster in the memory.

2. The method of claim 1, wherein identifying one or more sets of data elements shared by two or more correlated data groups comprises identifying respective first set of data elements shared by a first plurality of correlated data groups, and a second set of data elements shared by a second plurality of correlated data groups, wherein the first plurality of correlated data groups is larger than the second plurality of correlated data groups.

3. The method of claim 1, wherein the correlated data groups comprise television channel lineups, and wherein data associated with television channels comprise the respective data elements in each cluster of the plurality of clusters, at least one of the plurality of clusters comprising national channels that are shared by the two or more correlated data groups.

4. The method of claim 3, wherein each television channel lineup comprises data associated with at least one television channel and data associated with at least one television program aired on the at least one television channel.

5. The method of claim 4, wherein the data associated with at least one television channel includes television program listings for a period of time.

6. The method of claim 4, wherein:
identifying one or more sets of data elements comprises comparing two television channel lineups to determine whether the two lineup are similar within a first threshold; and
generating a respective cluster comprises combining two television channel lineups.

7. The method of claim 6, wherein combining two television channel lineups comprises merging the two television channel lineups without duplicate channels, so that the resultant cluster includes no more than one of each channel from the combination of the two television channel lineups.

8. The method of claim 4, wherein identifying one or more sets of data elements comprises:
comparing a non-clustered base lineup with one or more non-clustered target lineups to determine which of the one or more non clustered target lineups match the base lineup within a first threshold;
grouping the non-clustered base lineup with each of the matching non-clustered target lineups to produce a candidate cluster;
determining whether the candidate cluster has a number of non-overlapping channels that breaches a second threshold; and
in response to determining a breach of the second threshold, at least one of:
splitting the candidate cluster into two or more base groupings; and
ceasing to add further target lineups to the candidate cluster.

9. The method of claim 8, wherein generating a respective cluster comprises merging the non-clustered base lineup with the matching non-clustered target lineups without duplicate channels, so that the resultant cluster includes no more than one of each channel from the combination non-clustered base lineup and the matching non-clustered target lineups.

10. The method of claim 8, wherein the first threshold comprises an overlap indicator.

11. The method of claim 8, wherein the second threshold comprises a non-overlap indicator.

12. The method of claim 8, further comprising selecting a non-clustered base lineup.

13. The method of claim 8, further comprising selecting each non-clustered target lineup to compare to the non-clustered base lineup one at a time.

14. The method of claim 4, wherein identifying one or more sets of data elements comprises:
obtaining a respective frequency for each television channel based on the respective frequency for each data element of the one or more sets of data elements, wherein each respective frequency represents how many television channel lineups a particular channel is included in;
identifying candidate clusters by one or more frequency groupings; and
selecting clusters from the candidate clusters based at least on one characteristic.

15. The method of claim 14, wherein identifying candidate clusters comprises identifying one or more threshold values dividing one or more frequency groupings.

16. The method of claim 15, wherein identifying candidate clusters further comprises sub-dividing at least some frequency groupings into multiple candidate clusters based on at least one characteristic.

17. The method of claim 15, wherein the at least one characteristic includes one of location, popularity, language or type of content.

18. The method of claim 14, eliminating duplicate channels in each cluster, so that the resultant cluster includes no more than one of each channel from the combination of the two television channel lineups.

19. The method of claim 1, further comprising:
receiving a search query;
parsing the received search query to identify at least one query characteristic;
selecting one or more clusters based on at least one query characteristic;
searching the selected clusters; and
merging the search results.

20. A non-transitory computer readable storage medium storing one or more programs, the one or more programs comprising instructions for producing a search index for correlated data groups, which when executed by a computer system with one or more processors, cause the computer system to:
identify one or more sets of data elements shared by two or more correlated data groups, wherein the one or more sets of data elements are identified according to a respective frequency for each data element, and each respective frequency represents how many data groups the respective data element is included in;
generate a plurality of clusters, wherein a respective cluster of the plurality of clusters includes one of the one or more identified sets of data elements;
index each cluster of the plurality of clusters so that each respective cluster can be selected and searched independently from other ones of the plurality of clusters; and
store each indexed cluster in the memory.

21. The method of claim 14, wherein each national channel included in the at least one of the plurality of clusters has a substantially high frequency of being found in the television lineups.

* * * * *